United States Patent
Meggiolan

(10) Patent No.: US 9,296,257 B2
(45) Date of Patent: Mar. 29, 2016

(54) BICYCLE WHEEL RIM AND RESPECTIVE BICYCLE WHEEL

(71) Applicant: Campagnolo S.r.I., Vicenza (IT)

(72) Inventor: Mario Meggiolan, Creazzo-VI (IT)

(73) Assignee: Campagnolo S.r.l., Vicenza (IT)

( * ) Notice: Subject to any disclaimer, the term of this patent is extended or adjusted under 35 U.S.C. 154(b) by 129 days.

(21) Appl. No.: 14/178,561

(22) Filed: Feb. 12, 2014

(65) Prior Publication Data

US 2014/0225423 A1 Aug. 14, 2014

(30) Foreign Application Priority Data

Feb. 13, 2013 (IT) .............................. MI2013A0201

(51) Int. Cl.
| | |
|---|---|
| *B60B 21/00* | (2006.01) |
| *B60B 21/06* | (2006.01) |
| *B60B 1/00* | (2006.01) |
| *B60B 1/04* | (2006.01) |
| *B60B 21/02* | (2006.01) |

(52) U.S. Cl.
CPC ............... *B60B 21/062* (2013.01); *B60B 1/003* (2013.01); *B60B 1/041* (2013.01); *B60B 21/023* (2013.01); *B60B 21/025* (2013.01); *B60B 2360/104* (2013.01); *B60B 2360/341* (2013.01); *B60B 2900/111* (2013.01); *B60B 2900/311* (2013.01); *B60B 2900/321* (2013.01); *B60Y 2200/134* (2013.01)

(58) Field of Classification Search
CPC ........ B60B 21/00; B60B 21/04; B60B 21/06; B60B 21/064; B60B 1/00

USPC .............. 301/58, 61, 95.101, 95.104, 95.107, 301/104

See application file for complete search history.

(56) References Cited

U.S. PATENT DOCUMENTS

| 7,950,747 B2 * | 5/2011 | Mercat et al. .................... 301/55 |
| 2006/0138855 A1 * | 6/2006 | Schlanger ................ 301/95.101 |
| 2010/0090518 A1 * | 4/2010 | Schiers ........................... 301/55 |

FOREIGN PATENT DOCUMENTS

| EP | 1629996 A1 | 3/2006 |
| EP | 2422959 A1 | 2/2012 |
| EP | 2487047 A1 | 8/2012 |
| TW | 200940366 A | 10/2009 |

OTHER PUBLICATIONS

Italian Search Report and Written Opinion in Italian Application No. IT MI2013A000201, Sep. 11, 2013 with English translation.

\* cited by examiner

*Primary Examiner* — John Walters
*Assistant Examiner* — James Triggs
(74) *Attorney, Agent, or Firm* — Volpe and Koenig, P.C.

(57) ABSTRACT

The invention relates to a bicycle wheel rim (10), comprising a radially outer portion (12) configured to be coupled with a bicycle tire and a radially inner portion (14) comprising a plurality of attachment holes (16) for respective spokes. The radially inner portion (14) of the rim (10) comprises opposite side walls (14*a*, 14*b*) and a bottom wall (14*c*) in which said plurality of holes (16) is formed. Such a bottom wall (14*c*) is configured to house, at at least some of said holes (16), respective perforated inserts (18) for holding the head of said spokes. The radially inner portion (14) of the rim (10) also comprises a first discontinuity of curvature (14*d*, 14*e*) that separates at least one of said side walls (14*a*, 14*b*) from said bottom wall (14*c*).

10 Claims, 7 Drawing Sheets

BICYCLE WHEEL RIM AND RESPECTIVE BICYCLE WHEEL

CROSS REFERENCE TO RELATED APPLICATION

This application claims the benefit of Italian Application No. MI2013A000201, which was filed on Feb. 13, 2013, and is incorporated herein by reference as if fully set forth.

FIELD OF INVENTION

The present invention relates to a bicycle wheel rim. The invention also relates to a bicycle wheel comprising such a rim.

BACKGROUND

As known, a bicycle wheel rim comprises a radially outer portion configured to be coupled with a tire and a radially inner portion comprising a plurality of attachment holes for respective spokes.

Typically, the radially inner portion comprises opposite side walls and a bottom wall in which the aforementioned holes are formed.

"Symmetrical rims" and "asymmetrical rims" are known, that is rims whose radially inner portion has a radial section being respectively symmetrical or asymmetrical with respect to a sagittal middle plane of the rim.

In the present description and in the subsequent claims, the expression "sagittal middle plane" is used to indicate a plane perpendicular to the rotation axis of the rim and passing through the middle of the tire mounted on the rim. The sagittal middle plane thus coincides with the plane of symmetry of the tire mounted on the rim.

Typically, the spokes are associated with the wheel at the aforementioned holes and are oriented with a predetermined inclination with respect to the sagittal middle plane, so as to obtain a predetermined camber angle.

Symmetrical rims are frequently used for bicycle front wheels, whereas asymmetrical rims are often used for rear wheels. Indeed, the asymmetrical shape of the radially inner portion of the rim makes obtaining high camber angles easier, wherein high camber angles are required in particular for rear wheels due to the provision of the sprocket assembly on one side of the hub. Asymmetrical rims can, however, also be used in front wheels, particularly where disc brakes are used.

In the field of bicycles, in particular for racing bicycles, there is a particular need to manufacture rims that are strong and reliable, while at the same time being light.

Therefore, there is a tendency to make the walls of the radially inner portion of the rims with low thicknesses, such thicknesses still being sufficient to give the rim the desired characteristics of strength and reliability.

The Applicant has found that the head of the tightened spokes exerts a considerable stress on the rims in the contact area around the respective holes. Such stress determines a high concentration of tension at the holes, which involves the need to provide a predetermined thickness at least on the bottom wall.

EP 2422959 to the same Applicant discloses symmetrical rims provided with perforated inserts for holding the head of the spokes. The spokes pass through the inserts at respective holes made on a bottom wall of the rim. The inserts are arranged between the head of the spokes and the bottom wall, at the aforementioned holes.

The inserts described in EP 2422959 allow the stress generated by the tightened spokes to be distributed over a contact area around the holes of the bottom wall that is larger than that which there would be without inserts. Consequently, the thickness of the bottom wall can be advantageously lower than in the case in which the inserts are not used.

The Applicant has however found that the contact between the bottom wall and the insert can be improved. By improving the aforementioned contact, it is possible to improve the distribution over the rim of the stress generated by the tightened spokes, so as to further reduce the thickness of the bottom wall and, therefore, to further lighten the rim.

The Applicant has found that also in asymmetrical rims there is a need to reduce the thickness of the walls in order to lighten the rim and that also in this case such a requirement can be met by paying particular attention to the stresses generated on the rim by the attachment head for the tightened spokes.

The technical problem at the basis of the present invention is therefore to achieve an optimal distribution of tension over the rim (be it symmetrical or asymmetrical) of the tightened spokes, in order to be able to reduce the thickness of the rim and thus obtained a desired weight reduction.

SUMMARY OF THE INVENTION

The present invention therefore relates, in a first aspect thereof, to a bicycle wheel rim, comprising:
  a radially outer portion configured to be coupled with a bicycle tire;
  a radially inner portion comprising a plurality of attachment holes for respective spokes;
wherein said radially inner portion comprises opposite side walls and a bottom wall in which said plurality of holes is formed;
characterised in that said radially inner portion comprises a first discontinuity of curvature that separates at least one of said side walls from said bottom wall and in which said bottom wall is configured to house respective perforated inserts for holding the head of said spokes at at least some of said holes.

The present invention relates, in a second aspect thereof, to a bicycle wheel comprising the aforementioned rim.

In the present description and in the subsequent claims, the expression "discontinuity of curvature" is used to indicate a substantially sudden change in curvature along a given profile.

In the present description and in the subsequent claims, when reference is made to the head of the spokes both a configuration in which such a head is defined by a widening of the end part of a spoke and a configuration in which such a head is defined by a nipple that is screwed onto the end part of the spoke (such an end part being thus provided with a threading for the nipple to screw onto) is included. Instead of the nipple it is possible to use a different coupling member that can be associated in a conventional manner with the end part of the spoke.

Advantageously, the provision in the rim of the present invention of the aforementioned first discontinuity of curvature makes it possible to house perforated inserts for holding the head of the spokes at the bottom wall and to choose the curvature for such a bottom wall as a function of the curvature of the wall of the inserts configured to couple with the aforementioned bottom wall, irrespective of the profile or curvature of the side wall. Such a first discontinuity is therefore the more pronounced the greater the difference between the curvature of the side wall and the desired curvature of the bottom wall. It is thus possible to obtain an optimal distribution of the tensions generated on the bottom wall of the rim by the tightened spokes. Therefore, the thickness of such a bottom wall can be reduced, so as to give the desired lightness without penalizing the strength and reliability of the rim of the present invention.

In particular, the Applicant has found that the first discontinuity of curvature, when the spokes are tightened, causes a shrinking effect of the bottom wall of the rim and that such an effect is obtained irrespective of the profile of the radially inner portion of the rim (and therefore both on symmetrical and asymmetrical rims). Thanks to such an effect the mutual contact surface between perforated insert and bottom wall increases, and consequently the distribution of the tensions over the rim improves.

The Applicant has also found that providing a bottom wall having a curvature selected as a function of the curvature of the wall of the inserts advantageously allows the spoke to be oriented in order to obtain the desired camber angle, while keeping an optimal contact between perforated insert and bottom wall, with consequent optimal distribution of the tensions over the rim.

The present invention can, in any of the aforementioned aspects, comprise one or more of the following preferred characteristics, taken individually or in combination.

Preferably, said bottom wall has a predetermined profile and each of said perforated inserts comprises a coupling wall for coupling with said bottom wall, in which said coupling wall has a profile substantially matching said predetermined profile.

More preferably, said bottom wall has a substantially circular profile with a predetermined first bending radius and each of said perforated inserts comprises a coupling wall for coupling with said bottom wall, the coupling wall having a substantially circular profile with a bending radius substantially equal to said first bending radius.

In the present description and in the subsequent claims, the expression "substantially circular profile" is used to indicate a profile that, for a substantial part of the extension thereof, substantially follows the shape of an arc of circumference.

Advantageously, in this way a shape coupling between matching surfaces is obtained, i.e. the contact between perforated insert and bottom wall is optimal (with consequent optimal distribution of the tensions over the rim) and remains optimal irrespective of the specific inclination given to the spoke in order to obtain the desired camber angle.

In a first preferred embodiment of the rim of the present invention, said radially inner portion is symmetrical with respect to a sagittal middle plane of said rim. In this way a symmetrical rim is made.

In a second preferred embodiment of the rim of the present invention, said radially inner portion is asymmetrical with respect to a sagittal middle plane of said rim. In this way an asymmetrical rim is made.

Preferably, the rim of the present invention comprises a second discontinuity of curvature that separates the other side wall of said opposite side walls from said bottom wall.

In the case of symmetrical rims, such a second discontinuity of curvature of course mirrors the aforementioned first discontinuity of curvature with respect to the aforementioned sagittal middle plane.

On the other hand, in the case of asymmetrical rims, the aforementioned second discontinuity of curvature can be no mirror-like the aforementioned first discontinuity of curvature, i.e. it can be more or less pronounced than the first discontinuity of curvature and/or it can be arranged in a different radial position with respect to that of the first discontinuity of curvature.

The Applicant has found that, irrespective of the shape and position thereof, the second discontinuity of curvature, when the spokes are tightened, causes a greater shrinking of the bottom wall of the rim, with a consequent increase in the mutual contact surface between perforated insert and bottom wall and improvement of the distribution of tensions over the rim. This happens both in symmetrical rims and in asymmetrical rims.

Preferably, said at least one side wall has a substantially circular profile with a predetermined second bending radius that is greater than said first bending radius.

Alternatively, said at least one side wall has a substantially rectilinear profile.

Therefore, thanks to the provision of the aforementioned discontinuity of curvature it is possible to make in the bottom wall the desired profile, irrespective of the profile of the side wall.

In the case of asymmetrical rims, a preferred embodiment is provided in which a side wall of said opposite side walls has a substantially circular profile with said predetermined second bending radius and the other side wall of said opposite side walls has a substantially circular profile with a third bending radius that is different from said second bending radius.

Preferably, said first discontinuity of curvature is defined on both an axially inner surface and an axially outer surface of the radially inner portion of the rim.

Advantageously, in this way it is possible to make the bottom wall and the side wall of the radially inner portion of the rim with a substantially uniform thickness, in particular a substantially equal thickness, with clear advantages in terms of production and costs.

Preferably, said second discontinuity of curvature too is defined on both an axially inner surface and an axially outer surface of the radially inner portion of the rim.

BRIEF DESCRIPTION OF THE DRAWINGS

Further characteristics and advantages of the present invention will become clearer from the following detailed description of preferred embodiments thereof, made with reference to the attached drawings, given for indicating and not limiting purposes. In such drawings.

DETAILED DESCRIPTION OF THE PREFERRED EMBODIMENT(S)

With reference to FIGS. 1-6, a first embodiment of a bicycle wheel rim in accordance with the present invention is shown, which is wholly indicated with 10.

Figure 11:
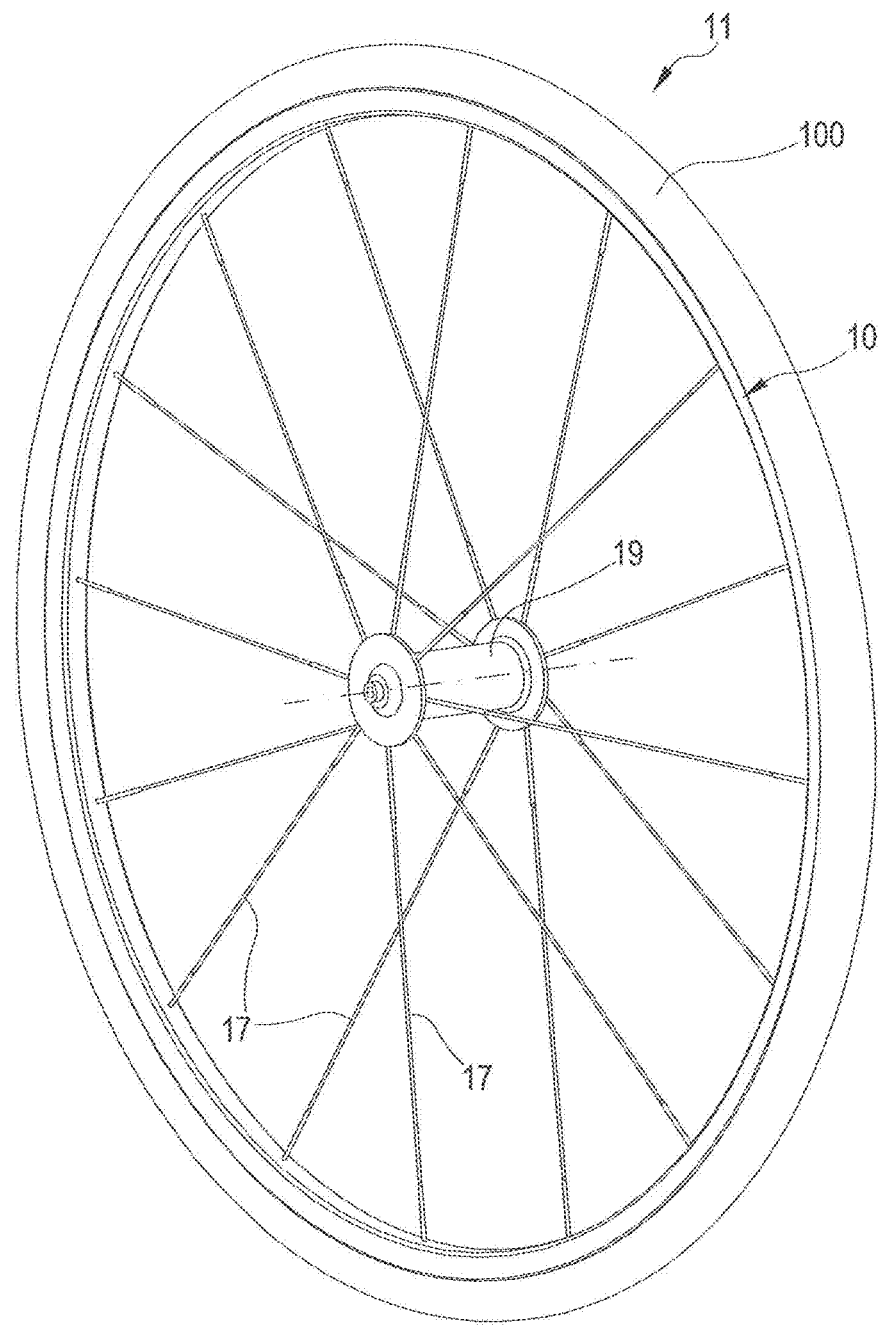
FIG. 11 schematically shows a perspective view of a bicycle wheel according to the present invention, comprising the rim of FIG. 1.

The rim 10 is part of a wheel 11 (FIG. 11), and comprises a radially outer portion 12 configured to be coupled with a tire 100 and a radially inner portion 14 comprising a plurality of attachment holes 16 (reference numeral 16 is associated with only some of the aforementioned holes) for respective spokes 17 (shown in FIG. 11, where reference numeral 17 is associated with only some of the aforementioned spokes). Such spokes 17 are connected to a hub 19 (FIG. 11) at their ends opposite those for attaching to the rim 10. The tire 100 is in this case preferably provided with an air chamber.

Preferably, the rim 10 is made, at least partially, from a composite material comprising structural fibres incorporated in a polymeric material, or from a light alloy, like for example aluminium or alloys thereof. There is nevertheless an embodiment in which the rim 10 is made from a metallic material, preferably a light alloy, for example aluminium or alloys thereof.

The radially outer portion 12 is separated from the radially inner portion 14 by a separating wall 13, which defines a support wall for the beads of the tire 100 at the radially outer portion 12.

The radially outer portion 12 has a substantially symmetrical radial section with respect to the sagittal middle plane X-X of the rim 10.

Figure 1:
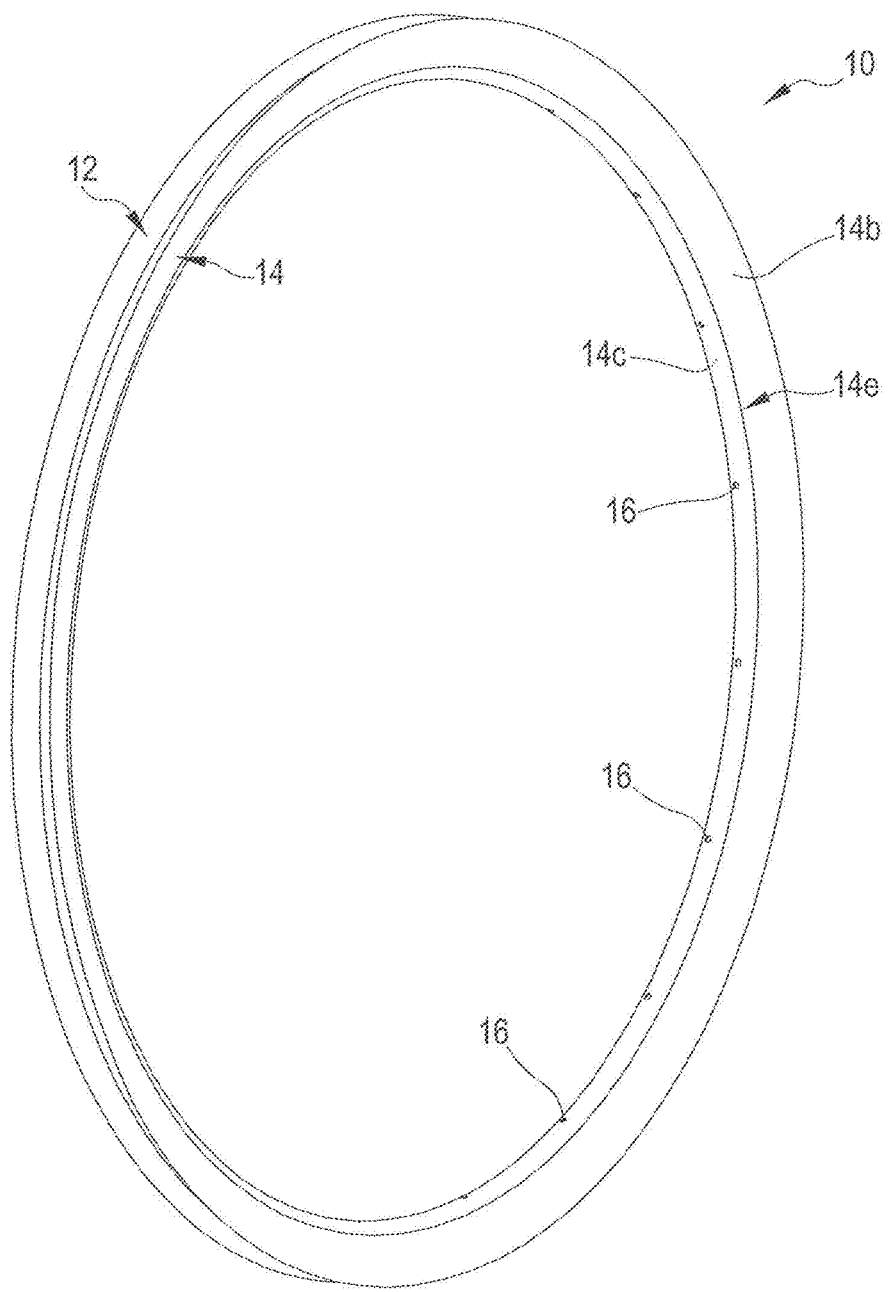
FIG. 1 schematically shows a perspective view of a first embodiment of the bicycle wheel rim according to the present invention.
Figure 2:
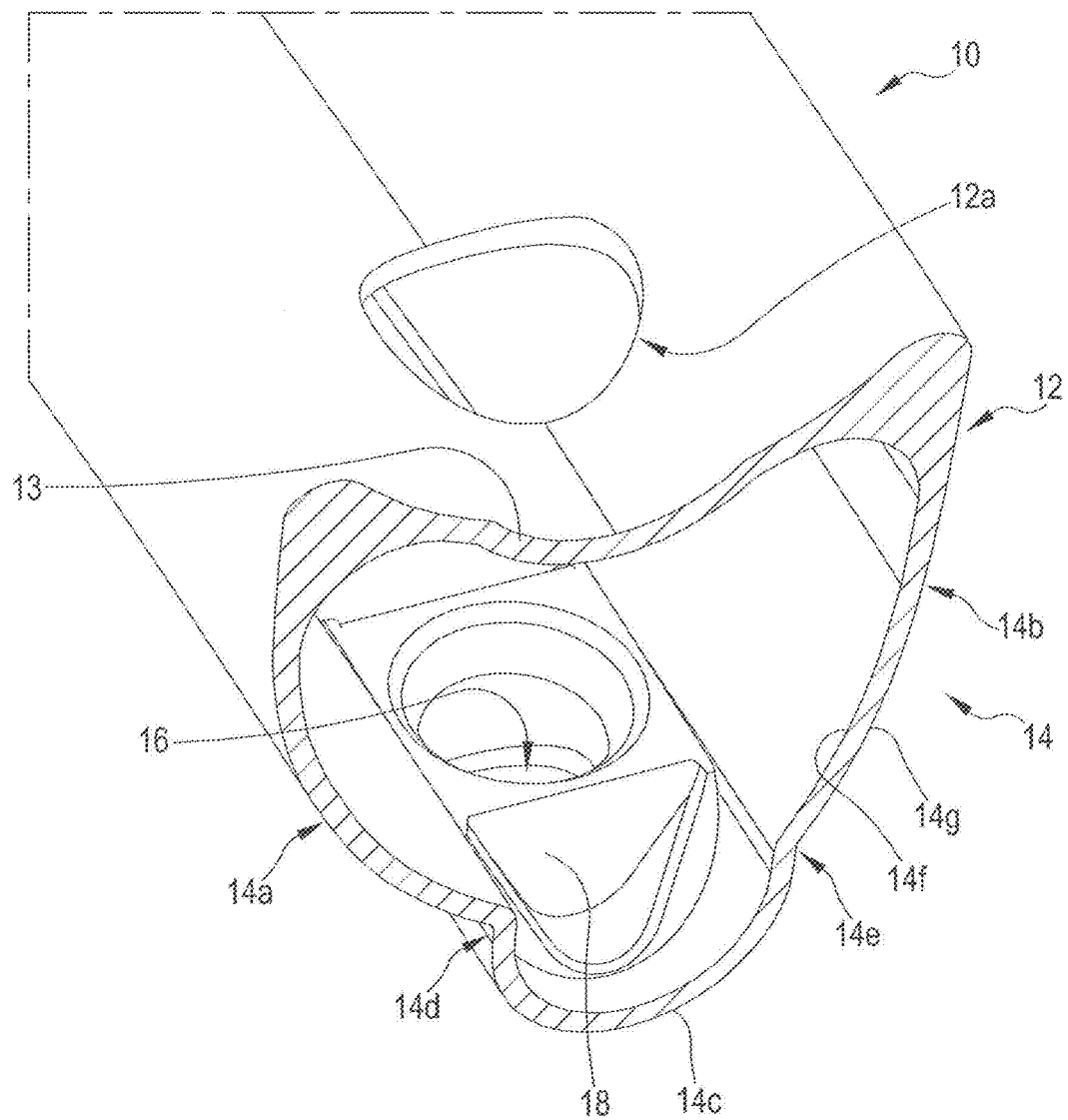
FIG. 2 schematically shows an enlarged perspective view of a section of the rim of FIG. 1.
Figure 3:
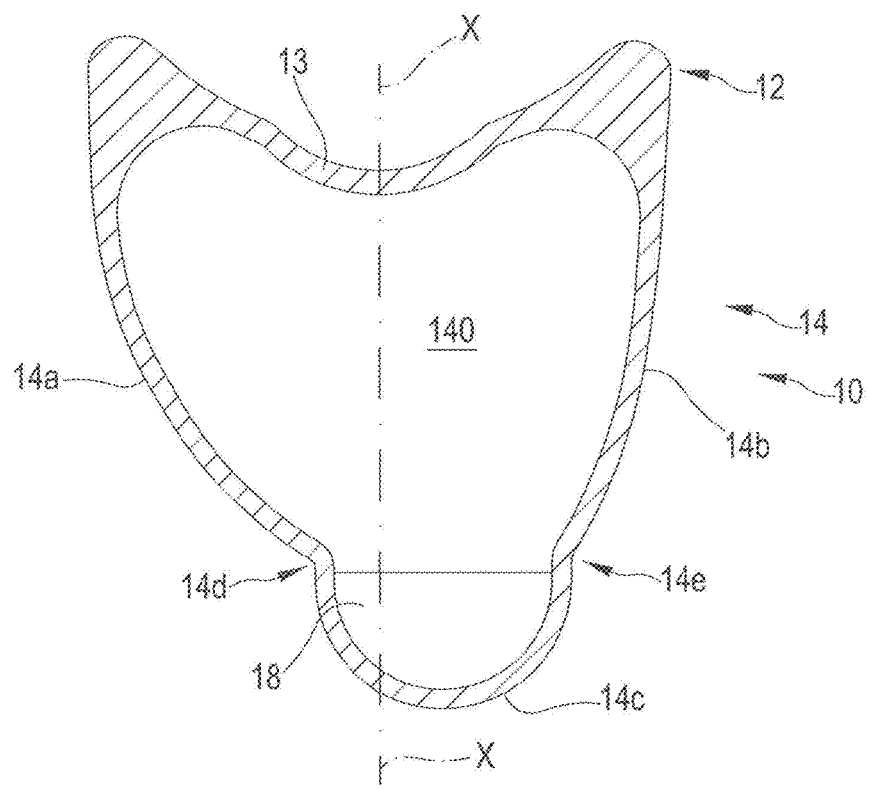
FIG. 3 schematically shows an enlarged radial section view of the rim of FIG. 1.
Figure 4:
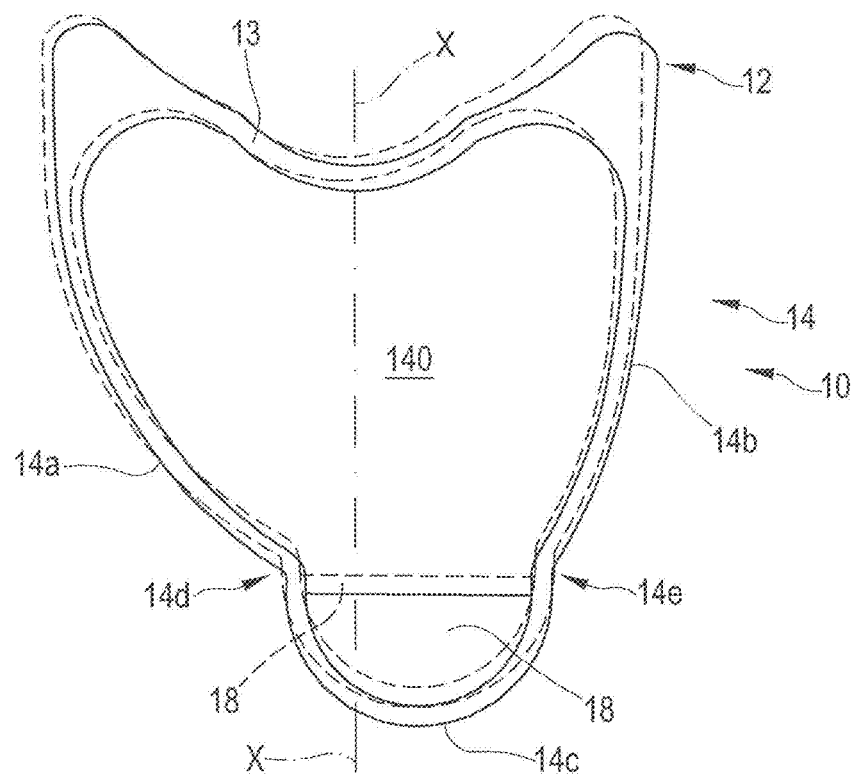
FIG. 4 schematically shows an enlarged radial section view of the rim of FIG. 1, in which the dashed lines show an undeformed configuration of the rim (which corresponds to that of FIG. 3) and the solid lines show a deformed configuration of the rim when the spokes (not shown) are tightened.

As is clearly shown in FIGS. 2-4, the radially inner portion 14 of the rim 10, on the other hand, is asymmetrical with respect to the sagittal middle plane X-X. This is therefore an asymmetrical rim.

The radially inner portion 14 comprises opposite side walls 14a, 14b and a bottom wall 14c in which the holes 16 are formed. Such walls 14a, 14b, together with the separating wall 13, define a single closed chamber 140 in the radially inner portion 14 of the rim 10 (FIG. 4).

The radially outer portion 12 comprises, at the holes 16 of the bottom wall 14c, a respective plurality of holes 12a for the insertion of the spokes 17 (FIG. 2). For the sake of simplicity of illustration, the holes 12a are not shown in FIG. 1.

As is clearly shown in FIGS. 2-6, the radially inner portion 14 comprises, at each side wall 14a, 14b, a respective discontinuity of curvature 14d, 14e that separates the side wall 14a, 14b from the bottom wall 14c. The bottom wall 14c is thus delimited, in a radially outer position thereof, by the aforementioned discontinuities of curvature 14d, 14e.

The discontinuities of curvature 14d, 14e are defined on both an axially inner surface 14f and an axially outer surface 14g of the radially inner portion 14 of the rim 10.

The discontinuities of curvature 14d, 14e are in mirroring position with respect to the sagittal middle plane X-X.

The bottom wall 14c preferably has a substantially circular profile with a predetermined bending radius (which is not indicated in the figures). The bottom wall 14c can alternatively have a substantially elliptical profile.

The bottom wall 14c houses, at at least some of the holes 16, respective perforated inserts 18 for holding the head of the spokes 17. The bottom wall 14c thus defines a seat for housing the perforated inserts 18.

Preferably, the perforated inserts 18 are made from a composite material comprising structural fibres incorporated in a polymeric material. In an alternative embodiment thereof, the perforated inserts 18 are made from a metallic material, preferably a light alloy, like for example aluminium or alloys thereof.

Figure 5:
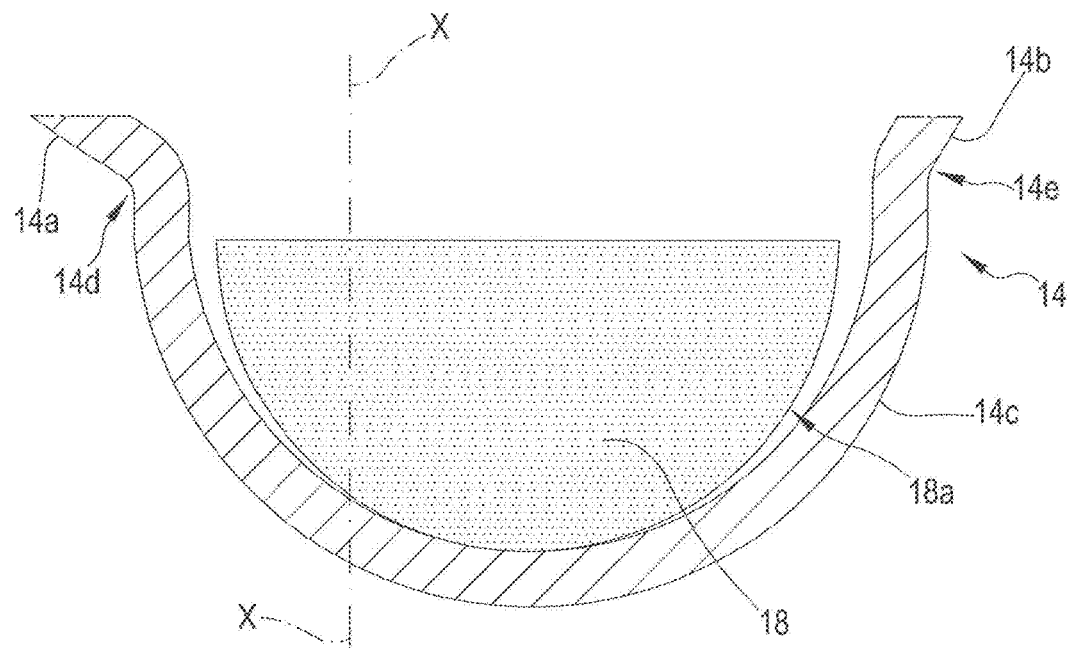
FIGS. 5 and 6 schematically show enlarged radial section views of the rim of FIG. 4, in the undeformed configuration of the rim and in the deformed configuration of the rim, respectively.

Each perforated insert 18 comprises a coupling wall 18a for coupling with the bottom wall 14c (FIG. 5).

Such a coupling wall 18a has a profile matching that of the bottom wall 14c.

In the non-limiting preferred example shown in FIGS. 2-6, the coupling wall 18a has a substantially circular profile with a bending radius (not indicated in the figures) which is substantially equal to the bending radius of the bottom wall 14c. In FIG. 5 an excessive space has been deliberately left between coupling wall 18a of the perforated insert 18 and bottom wall 14c to better show the different mutual positioning between insert 18 and bottom wall 14c before and after tightening of the spokes, as will become clear hereafter.

The perforated insert 18 can be of the same type of that described in EP 2422959. In the case of a rim 10 made from composite material, the perforated insert 18 can be co-moulded with the rim 10.

The side wall 14a (shown on the left in FIGS. 2-4) has a substantially circular profile with a predetermined bending radius (not indicated in the figures) that is greater than the bending radius of the bottom wall 14c.

The side wall 14b (shown on the right in FIGS. 2-4) also has a substantially circular profile with a predetermined bending radius (not indicated in the figures) that is greater than the bending radius of the bottom wall 14c. In the non-limiting example shown in FIGS. 2-4, the bending radius of the side wall 14b is greater than the bending radius of the side wall 14a.

Figure 6:
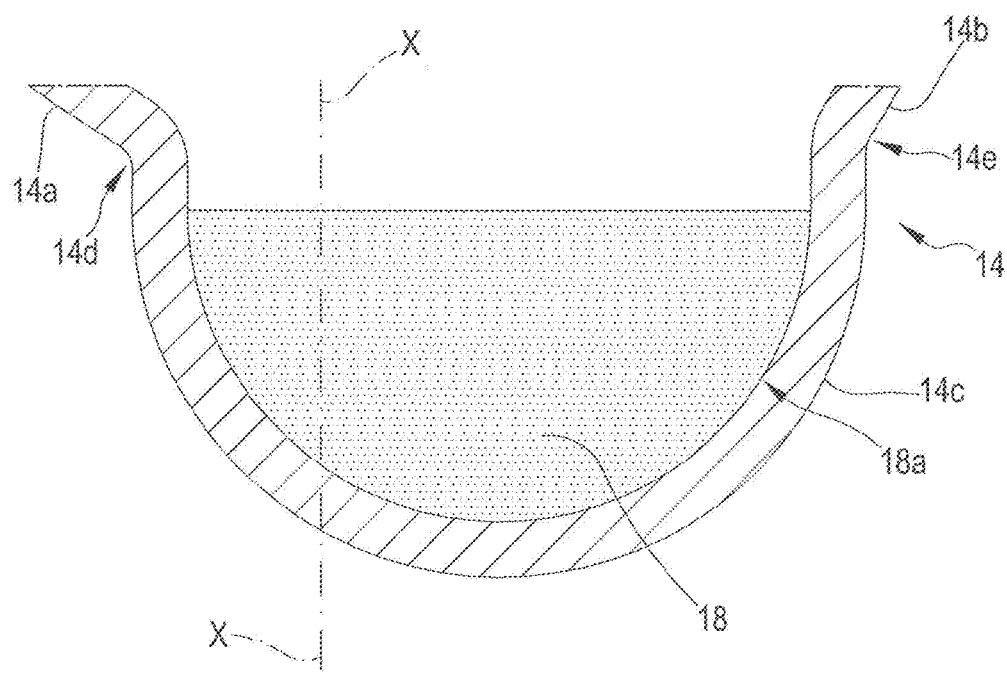

FIGS. 4-6 show the deformation the rim 10 is subjected to following the tightening of the spokes 17, in particular in the case of a rim 10 made from composite material.

As already stated, the rim 10 is schematically drawn with dashed lines to illustrate an undeformed configuration thereof (which corresponds to that of FIG. 3) and with a solid line to illustrate a deformed configuration thereof when spokes 17 are tightened. Similarly, the insert 18 is schematically drawn with dashed lines in the undeformed configuration of the rim 10 and with solid lines in the deformed configuration of the rim 10.

FIGS. 5 and 6 show enlarged views of the bottom wall 14c and the perforated insert 18 in the undeformed configuration and in the deformed configuration of the rim 10, respectively.

From the comparison between FIGS. 5 and 6, it can be seen that in the deformed configuration of the rim 10 the contact surface between the bottom wall 14c and coupling wall 18a of the perforated insert 18 is larger than that in the undeformed configuration of the rim 10. This is as a consequence of the shrinking effect in the bottom wall 14c of the rim 10 obtained in the tightening step of the spokes 17 thanks to the provision of the discontinuities of curvature 14d, 14e. Of course, the advantageous shrinking effect (and therefore the advantageous increase in contact surface between bottom wall 14c and coupling wall 18a of the perforated insert 18) can also be obtained by providing just one of the discontinuities of curvature 14d, 14e.

Figure 7:
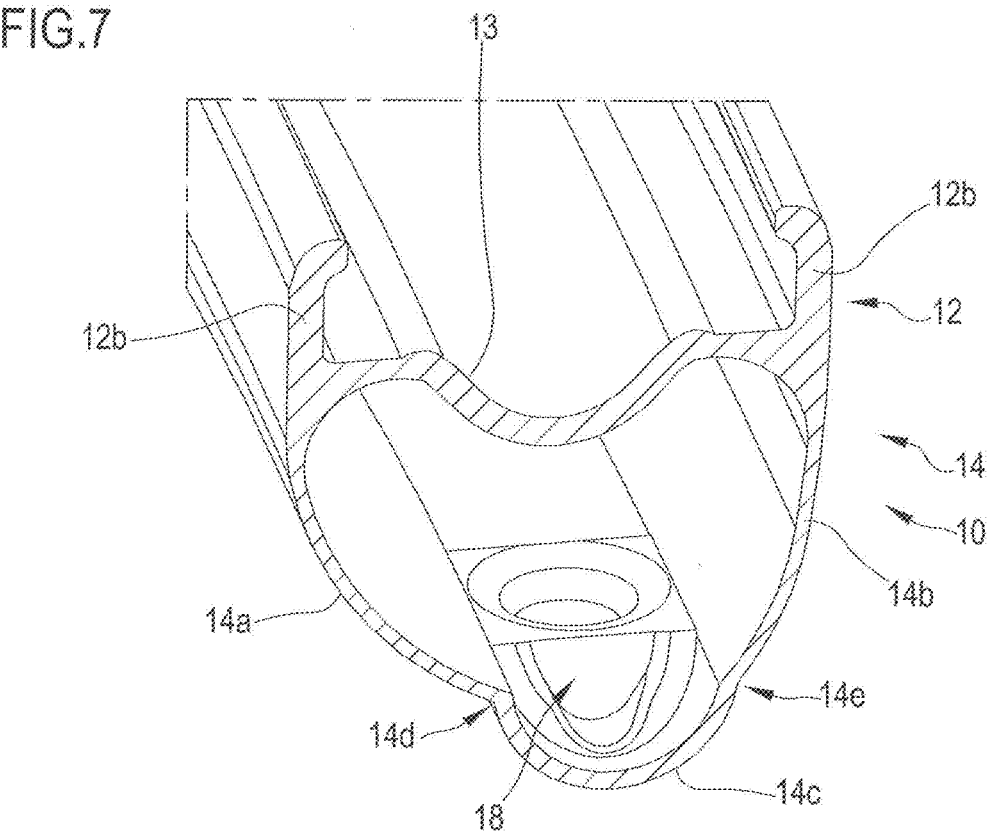
FIG. 7 schematically shows an enlarged perspective view of a section of a second embodiment of the bicycle wheel rim according to the present invention.
Figure 8:
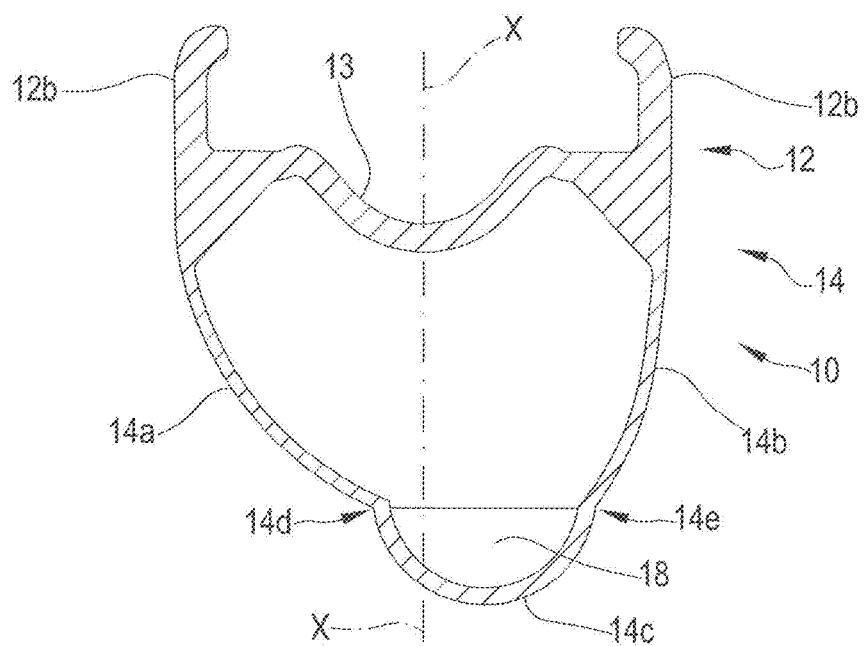
FIG. 8 schematically shows an enlarged radial section view of the rim of FIG. 7.

With reference to FIGS. 7 and 8, a second embodiment of a bicycle wheel rim 10 in accordance with the present invention is shown.

In FIGS. 7 and 8 structural elements that are identical or equivalent from the functional point of view to those of the rim 10 described above with reference to FIGS. 1-6 will be given the same reference numerals and they will not be described any further.

The rim 10 of FIGS. 7 and 8 is an asymmetrical rim too. However, it differs from the rim 10 of FIGS. 2-6 substantially at the radially outer portion 12 thereof.

In particular, the radially outer portion 12 of the rim of FIGS. 7 and 8 has a substantially symmetrical radial section with respect to the sagittal middle plane X-X of the rim 10, but unlike the radially outer portion 12 of the rim 10 of FIGS. 2-6, it comprises opposite annular wings 12b for fastening the tire 100. Such a tire 100 may or may not have an air chamber.

The radially inner portion 14, on the other hand, is substantially the same as that of the rim 10 of FIGS. 2-6.

Figure 9:
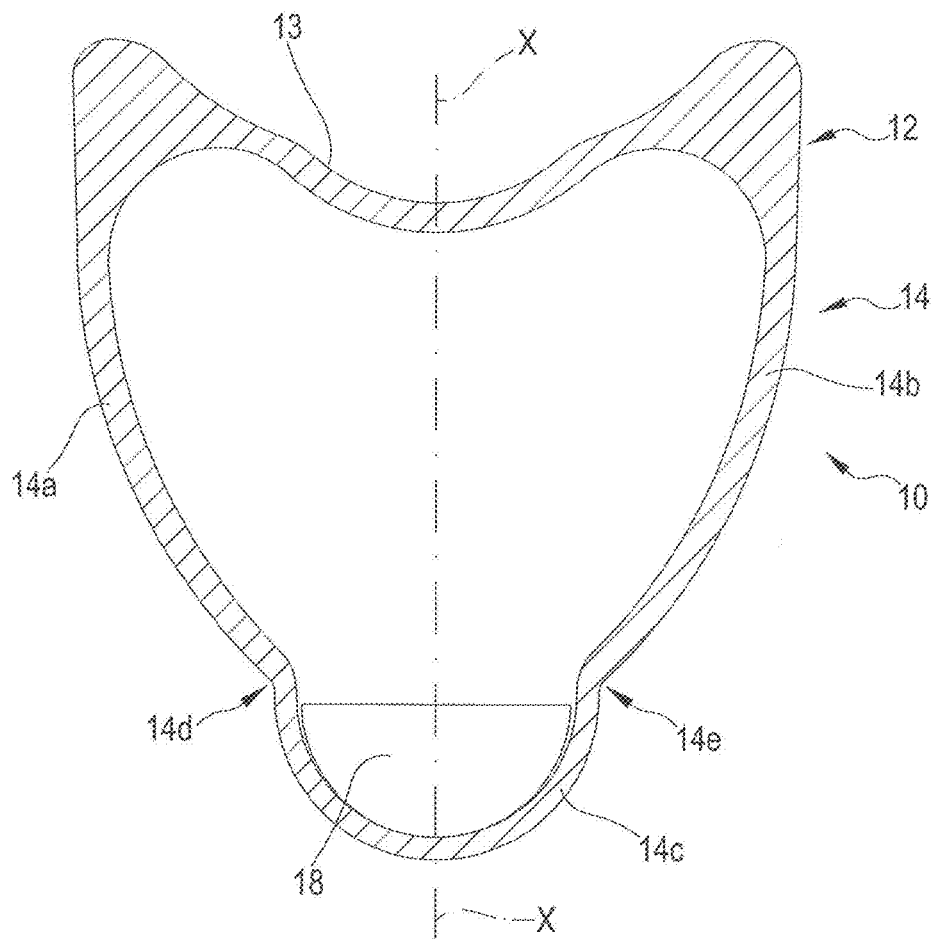
FIG. 9 schematically shows a radial section view of a third embodiment of the bicycle wheel rim according to the present invention.
Figure 10:
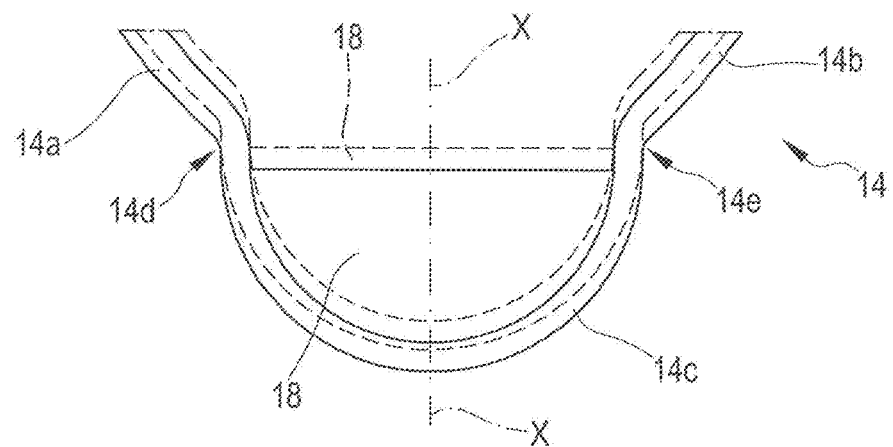
FIG. 10 schematically shows an enlarged radial section view of the rim of FIG. 9, in which the dashed lines show an undeformed configuration of the rim and the solid lines show a deformed configuration of the rime when the spokes (not shown) are tightened.

With reference to FIGS. 9 and 10, a third embodiment of a bicycle wheel rim 10 in accordance with the present invention is shown.

In FIGS. 9 and 10 structural elements that are identical or equivalent from the functional point of view to those of the rim 10 described above with reference to FIGS. 1-6 will be given the same reference numerals and they will not be described any further.

In particular, the rim 10 of FIGS. 9 and 10 differs from the rim 10 of FIGS. 2-6 substantially in that it is a symmetrical rim.

In particular, the radially inner portion 14 is symmetrical with respect to the sagittal middle plane X-X.

More specifically, the opposite side walls 14a and 14b of the radially inner portion 14 are symmetrical with respect to the sagittal middle plane X-X and have a substantially circular profile with a bending radius (not indicated in the figures) that is greater than the bending radius of the bottom wall 14c.

FIG. 10 shows the deformation that the radially inner portion 14 of the rim 10 is subjected to when spokes 17 are tightened, in particular in the case of a rim 10 made from composite material.

Also in this case, the rim 10 is schematically drawn with dashed lines to illustrate an undeformed configuration thereof (which corresponds to that of FIG. 9) and with solid lines to illustrate a deformed configuration thereof when spokes 17 are tightened. Similarly, the insert 18 is schematically drawn with dashed lines in the undeformed configuration of the rim 10 and with solid lines in the deformed configuration of the rim 10. It is clear how also in this case there is an advantageous shrinking effect and, consequently, an advantageous increase in contact surface between bottom wall 14c and coupling wall 18a of the perforated insert 18.

It is particularly advantageous providing the aforementioned discontinuities of curvature 14d, 14e, as well as in asymmetrical rims 10, also in symmetrical rims with low profile, where the side walls 14a, 14b of the radially inner portion 14 have a substantially circular profile with a bending radius that is greater than that desired for the bottom wall 14c.

Of course, a man skilled in the art can bring numerous modifications and variants to the bicycle wheel rim 10 and to the respective bicycle wheel 11 described above, in order to satisfy specific and contingent requirements, all of which are in any case within the scope of protection of the present invention as defined by the following claims.

What is claimed is:

1. A bicycle wheel rim, comprising:
   a radially outer portion configured to be coupled with a bicycle tire; and
   a radially inner portion comprising a plurality of attachment holes for respective spokes;
   wherein said radially inner portion comprises opposite side walls with inner and outer surfaces and a bottom wall in which said plurality of holes is formed; and
   wherein said radially inner portion comprises a first discontinuity of curvature at said inner and outer surfaces and said first discontinuity separates at least one of said side walls from said bottom wall and wherein said bottom wall is configured to house respective perforated inserts for holding respective heads associated with said spokes at at least some of said holes.

2. The rim according to claim 1, wherein said bottom wall has a predetermined profile and each of said perforated inserts comprises a coupling wall for coupling with said bottom wall, wherein said coupling wall has a profile substantially matching said predetermined profile.

3. The rim according to claim 1, wherein said bottom wall has a substantially circular profile with a predetermined first bending radius and each of said perforated inserts comprises a coupling wall for coupling with said bottom wall, said coupling wall having a substantially circular profile with a bending radius which is substantially equal to said first bending radius.

4. The rim according to claim 1, wherein said radially inner portion is symmetrical with respect to a sagittal middle plane of said rim.

5. The rim according to claim 1, wherein said radially inner portion is asymmetrical with respect to a sagittal middle plane of said rim.

6. The rim according to claim 1, comprising a second discontinuity of curvature that separates the other side wall of said opposite side walls from said bottom wall.

7. The rim according to claim 1, wherein said bottom wall has a substantially circular profile with a predetermined first bending radius and said at least one side wall has a substantially circular profile with a predetermined second bending radius that is greater than said first bending radius.

8. The rim according to claim 7, wherein said radially inner portion is asymmetrical with respect to a sagittal middle plane of said rim, wherein a side wall of said opposite side walls has a substantially circular profile with said predetermined second bending radius and the other side wall of said opposite side walls has a substantially circular profile with a third bending radius that is different from said second bending radius.

9. The rim according to claim 1, wherein said at least one side wall has a substantially rectilinear profile.

10. A bicycle wheel comprising a rim according to claim 1.

* * * * *